Figure 1:
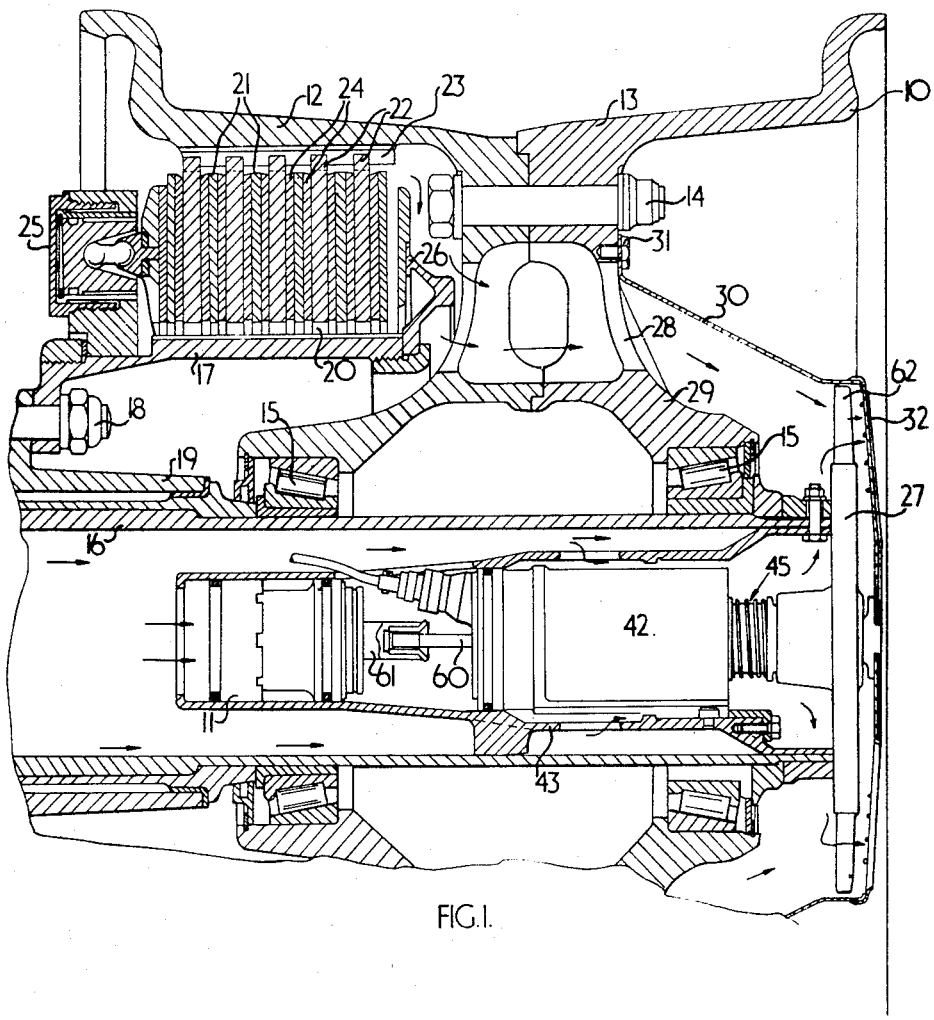

United States Patent [19]
Buckley

[11] 3,734,247
[45] May 22, 1973

[54] AIR COOLED BRAKE ASSEMBLY

[75] Inventor: Stanley G. Buckley, Erdington, Birmingham 24, England

[73] Assignee: Dunlop Holdings Limited, London, England

[22] Filed: Nov. 19, 1971

[21] Appl. No.: 200,351

[30] Foreign Application Priority Data

Nov. 25, 1970 Great Britain..................56,002/70

[52] U.S. Cl. ............................................188/264 A
[51] Int. Cl.................................................F16d 65/78
[58] Field of Search .....................188/264 R, 264 A, 188/264 AA

[56] References Cited

UNITED STATES PATENTS

| | | | |
|---|---|---|---|
| 2,822,997 | 2/1958 | Du Bois | 188/264 A X |
| 3,335,834 | 8/1967 | Wach | 188/264 A X |

*Primary Examiner*—Richard A. Schacher
*Attorney*—Richard K. Stevens et al.

[57] ABSTRACT

A wheel brake assembly comprising a wheel detachably mounted on an axle, a brake assembly disposed between the wheel rim and the axle, and an air impeller carried by and rotatably supported or a support member carried by the wheel, the arrangement being such that when the wheel and support member are assembled on the axle the impeller is rotatably drivable through a friction drive mechanism to pass a current of air through the brake assembly. Of which the following is a specification.

11 Claims, 2 Drawing Figures

AIR COOLED BRAKE ASSEMBLY

This invention relates to air cooled wheel and brake assemblies and particularly, though not exclusively, to air cooled wheel and brake assemblies for aircraft.

As an aircraft lands and the brakes are applied, kinetic energy is converted into heat in the brake assembly. In the case of heavy aircraft having high landing speeds the rise in temperature of the wheel and brake assembly which results from the heat build-up may be particularly high and, unless checked, can cause distortion of the wheel and brake discs, damage to the tires, and can unduly delay the turn round time of the aircraft.

In previously proposed wheel and brake assemblies, such as that described in the specification of our U.K. Pat. No. 943,472, a fan is arranged at the axially outer end of a wheel axle to draw air through the annular space between the wheel rim and wheel axle and thereby extract heat from the brake. This substantially increases the cooling rate of the brake and thereby prevents excessive temperature rises.

In order for the fan to pass sufficient air through the wheel and brake assembly the outer diameter of the fan impeller needs to be greater than the diameter of the wheel axle. Thus the relatively large diameter impeller prevents the direct removal of the wheel from the axle, and it is necessary to disassemble the impeller from the fan assembly before the wheel may be axially withdrawn in a conventional manner.

A further disadvantage of the currently used construction in which the impeller prevents direct removal of the wheel is that the blades of the impeller are rendered liable to damage very time that a wheel is removed.

It is one object of the present invention to provide an improved fan assembly for use in conjunction with wheel and brake assemblies.

According to one aspect of the present invention a wheel and brake assembly comprises a wheel detachably mounted on an axle, a brake assembly disposed between the wheel rim and the axle, a support member carried by the wheel, and an air impeller carried by and rotatably supported on the support member, the arrangement being such that when the wheel and support member are assembled on the axle the impeller is rotatably drivable through a friction drive mechanism by a driving motor to pass a current of air through the brake assembly.

According to a further aspect of the present invention a wheel and brake assembly comprises a wheel detachably mounted on an axle, a brake assembly disposed between the wheel rim and the axle, a support member carried by the wheel, and an air impeller carried by and rotatably supported by the support member, the arrangement being such that when the wheel and support are assembled on the axle the impeller is rotatably drivable through a friction drive mechanism by a driving motor to pass a current of air through the brake assembly, a second drive shaft extending rotatably through the driving motor and engaging the support member to rotate therewith.

The second shaft may be used to drive a wheel speed sensor, and the sensor and driving motor may conveniently be housed in an in-line configuration within a hollow axle.

Figure 2:
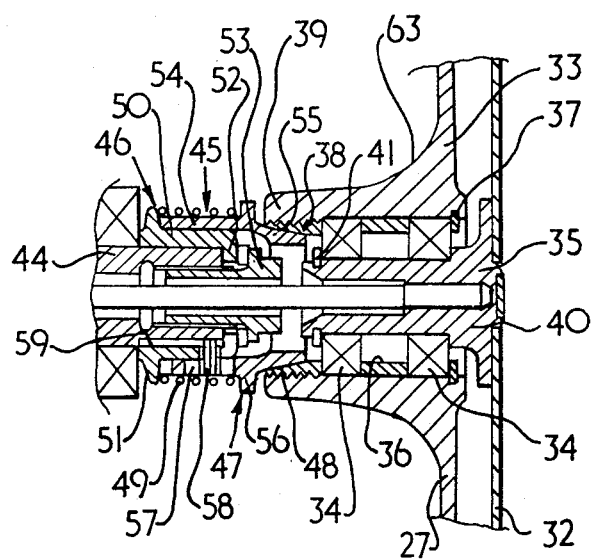

One particular embodiment of the invention will now be described by way of example with reference to the accompanying drawings in which:

FIG. 1 is a longitudinal sectional view through a wheel and brake assembly in accordance with the present invention, and FIG. 2 is a detailed sectional view of the friction clutch shown in FIG. 1.

A wheel rim 10, of an aircraft wheel and brake assembly incorporating a sensor 11 for an anti-skid braking system, is formed of two axially separable parts 12,13 secured together by bolts 14 and rotatably supported by bearings 15 on a relatively fixed hollow axle 16 secured to an oleo leg (not shown). An annular torque member 17 is secured by bolts 18 to a sleeve 19 fixed on to the axle 16 and is formed with splines 20 on which are slidably mounted stator brake discs 21. Corresponding rotor brake discs 22 are mounted to slide on splines 23 on the wheel rim 10 and are interleaved with the stator discs, layers of friction material 24 being attached to the stator discs so as to be interposed between adjacent rotor and stator discs. A number of brake cylinders 25 are disposed in a circle around the axle, and on admission of fluid under pressure to the cylinders, the assembly of brake discs 21,22 with the intervening layers of friction material 24 is compressed axially against an annular reaction member 26 at one end of the stack of discs.

In operation the brake may be cooled by drawing air, by means of an impeller 27, through the brake assembly, through apertures 28 in the web portion 29 of the wheel, and through a duct 30 in the form of an annular frusto-conical shield fixed to the wheel adjacent the rim portion by screws 31. The air emerges through a grating 32 secured to the axially outermost end of the shield.

The impeller 27 is provided at its center with an axially extending annular hub portion 33 (see FIG. 2) rotatably mounted by a pair of low friction bearings 34 on a hollow impeller support tube 35 fastened to the grating 32 and extending coaxially towards the interior of the hollow axle. A spacer 36 maintains the bearings in spaced axial relationship between a pair of shoulders provided on the hub portion 33 by a circlip 37 and an annular stop member 38 screwed into the axially innermost end 39 of the impeller hub 33 in the same sense as the direction of rotation of the driving motor. The impeller and bearing assembly is retained on the support tube 35, against a shoulder 40 formed thereon, by means of another circlip 41. The impeller assembly is thus rotatably attached to the axially inner side of the grating 32 by means of the impeller support tube, and the axis of rotation of the assembled impeller on the grating is aligned with the axis of rotation of the wheel.

The impeller is drivable by an electric motor 42 located in a tubular support housing 43 within the hollow wheel axle 16. The motor is provided with a tubular drive shaft 44 to which a friction clutch 45 is fitted for the transmission of drive from the motor to the impeller.

The friction clutch comprises a thrust member 46, and a pressure member 47 which is rotatable by the motor and which is urged against a reaction surface 48 on the axially inner end 39 of the impeller hub by means of a cylindrical helical compression spring 49.

The thrust member 46 is in the form of a cylindrical tube 50 which fits over the motor drive shaft 44 and is provided with a radially outwardly projecting annular lip 51 at its axially inner end to support the axially inner end of the compression spring. Axial location of the thrust member on the drive shaft is provided by a radially inwardly projecting annular lip 52 formed at the axially outer end of the thrust member, and extending over the end of the motor drive shaft. A tubular retaining bolt 53 is screwed axially into the end of the drive shaft 44 to clamp the aforementioned lip 52 between the bolt head and the end of the motor drive shaft.

The pressure member 47 comprises a cylindrical portion 54 slidably mounted on the thrust member, and an axially outer portion 55 of frusto-conical shape which tapers from the end of the cylindrical portion. The frusto-conical portions acts as a clutch friction surface and is urged against a corresponding friction surface on the impeller hub by means of the compression spring 49 acting on an outwardly extending lip 56 formed at the base of the frusto-conical portion of the pressure member. The corresponding friction surface on the impeller hub is formed on the conical face of the annular stop member 38 which is screwed into the inner end of the impeller hub.

To limit axial movement of the pressure member 47 outwardly from the thrust member 46 under the action of the spring when the impeller assembly is removed from the wheel, a longitudinal slot 57 is provided in the cylindrical portion 54 of the pressure member and accommodates the head portion of a set screw 58 screwed radially into the thrust member. The radially inner end of the set screw extends into a longitudinal groove 59 formed on the surface of the motor drive shaft and thereby secures the clutch assembly and motor drive shaft against relative rotation.

A wheel speed sensor 11 forming part of an anti-skid braking system is mounted within the tubular support housing 43, axially inwardly from the motor 42 and grating 32. To transmit the rotation of the wheel to the sensor a sensor drive shaft 60 extends coaxially and relatively rotatably through the electric motor and friction clutch 45. The shaft is splined at each end to engage corresponding splines formed on the end of the input shaft 61 of the sensor and within the impeller support tube 35. Thus, in the arrangement of this embodiment, the use of a hollow motor drive shaft 44 in conjunction with the type of clutch described permits a compact arrangement of a wheel speed sensor and an electric motor within a hollow wheel axle.

The impeller has radially extending fan blades 62 which induce air to flow over the brake discs as described, and also has internal vanes 63 (see FIG. 2) which cause a current of air to flow through the hollow axle 16 and apertured support housing 43 for the purpose of cooling the motor and sensor. A particular advantage of the embodiment described above is that by retaining the impeller within the shield the fan blades are substantially protected from accidental damage whenever the wheel is disassembled from the axle.

While in the embodiment described, the coupling between the motor and impeller is in the form of a conical friction clutch, it is to be understood that the use of alternative frictional coupling means such as a plate clutch lies within the scope of the present invention. Likewise, various designs of shield and grating assemblies are known to persons skilled in the art, and may be used as an alternative to the integral shield and grating design described to support the impeller assembly.

Having now described my invention what I claim is:

1. A wheel and brake assembly comprising a wheel detachably mounted on an axle, a brake assembly disposed between the wheel rim and the axle, a support member carried by the wheel, and an air impeller carried by and rotatably supported on the support member, the arrangement being such that when the wheel and support member are assembled on the axle the impeller is rotatably drivable through a friction drive mechanism by a driving motor to pass a current of air through the brake assembly.

2. A wheel and brake assembly according to claim 1 wherein the friction drive mechanism comprises a friction clutch having a pair of friction surfaces for spring-loaded engagement with each other.

3. A wheel and brake assembly according to claim 2 wherein the friction clutch comprises a first friction surface provided on a hub portion of the air impeller, and a second friction surface provided on a pressure member associated with the drive shaft of the driving motor so as to rotate with the drive shaft of the motor, the pressure member being spring-loaded axially relative to the drive shaft.

4. A wheel and brake assembly according to claim 3 wherein the impeller is rotatably supported on the support member by means of at least one low-friction bearing located within the hub portion of the impeller, the impeller being secured against axial movement in one direction relative to the support member by means of an annular stop member secured within the axially inner end of the hub portion, a surface of the annular stop member constituting the first friction surface of the friction clutch.

5. A wheel and brake assembly according to claim 2 wherein the friction clutch is a conical clutch comprising a pair of substantially conical-shaped friction surfaces.

6. A wheel and brake assembly according to claim 1 wherein the support member comprises a grating through which a current of air may be induced by the impeller to provide cooling for the brake assembly.

7. A wheel and brake assembly according to claim 1 wherein the support member comprises a duct in the form of a frusto-conical shield and defines the radially outer boundary of an air passage between the impeller and the brake assembly.

8. A wheel and brake assembly according to claim 1 wherein a second drive shaft extends rotatably through the driving motor and engages the support member to rotate therewith.

9. A wheel and brake assembly according to claim 8 wherein the second drive shaft is arranged to transmit rotation of the support member to a wheel speed sensor mounted coaxially with the driving motor within the axle of the wheel and brake assembly.

10. A wheel and brake assembly according to claim 9 wherein the drive shaft of the driving motor is tubular and the friction drive mechanism is provided with a central passage coaxial with the motor drive shaft to permit the second drive shaft to extend through the driving motor and friction drive mechanism, one end of the second drive shaft engaging the impeller support member to rotate therewith and the other end of the second drive shaft being associated with the wheel speed sensor to transmit rotation of the wheel thereto.

11. A wheel and brake assembly according to claim 9 wherein the wheel speed sensor and driving motor are secured relative to one another within a tubular support housing locatable in the axle of the wheel and brake assembly.

* * * * *